(12) United States Patent
Ide (10) Patent No.: US 11,801,854 B2
(45) Date of Patent: Oct. 31, 2023

(54) LOAD WEIGHT NOTIFICATION DEVICE

(71) Applicant: TOYOTA JIDOSHA KABUSHIKI KAISHA, Toyota (JP)

(72) Inventor: Hirohito Ide, Nagoya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 237 days.

(21) Appl. No.: 17/502,515

(22) Filed: Oct. 15, 2021

(65) Prior Publication Data

US 2022/0194405 A1 Jun. 23, 2022

(30) Foreign Application Priority Data

Dec. 18, 2020 (JP) ................. 2020-209815

(51) Int. Cl.
*B60W 50/14* (2020.01)
*G01G 19/08* (2006.01)
*B60W 40/13* (2012.01)

(52) U.S. Cl.
CPC ............ *B60W 50/14* (2013.01); *B60W 40/13* (2013.01); *G01G 19/08* (2013.01); *B60W 2530/10* (2013.01)

(58) Field of Classification Search
CPC .. B60W 50/14; B60W 40/13; B60W 2530/10; G01G 19/08
See application file for complete search history.

(56) References Cited

U.S. PATENT DOCUMENTS

| | | | |
|---|---|---|---|
| 9,933,294 B1* | 4/2018 | Salter | G01G 23/36 |
| 2002/0171540 A1* | 11/2002 | Ando | B60N 2/002 |
| | | | 340/425.5 |
| 2017/0101111 A1* | 4/2017 | Fung | B60K 35/00 |
| 2019/0263320 A1* | 8/2019 | Onodera | B60Q 9/00 |
| 2019/0273817 A1* | 9/2019 | Ueno | G08G 1/005 |
| 2020/0391693 A1* | 12/2020 | Kang | B60N 2/28 |

FOREIGN PATENT DOCUMENTS

JP 2007-218646 A 8/2007

* cited by examiner

*Primary Examiner* — Mohamed Barakat
(74) *Attorney, Agent, or Firm* — Dinsmore & Shohl LLP (57) ABSTRACT

A load weight notification device includes a weight sensor configured to detect a load weight of a vehicle as a detection weight, an output device configured to at least notify a passenger in the vehicle of information, and a controller configured to, in a case where the detection weight obtained during an opening period of a door of the vehicle exceeds a prescribed first threshold value, instruct the output device to notify the passenger of information indicating overweight, in which the controller is configured to, until completion of an initial closing operation that is a closing operation of the door performed after the vehicle is activated until the vehicle starts traveling, not instruct the output device to notify the passenger in the vehicle of the information indicating the overweight even when the detection weight exceeds the first threshold value.

5 Claims, 7 Drawing Sheets

LOAD WEIGHT NOTIFICATION DEVICE

CROSS-REFERENCE TO RELATED APPLICATION

This application claims priority to Japanese Patent Application No. 2020-209815 filed on Dec. 18, 2020, incorporated herein by reference in its entirety.

BACKGROUND

1. Technical Field

The present specification discloses a load weight notification device that gives notice of information indicating overweight in a case where a load weight of a vehicle exceeds a first threshold value.

2. Description of Related Art

In a shared vehicle, such as a bus, on which unspecified passengers get on and off, the management of the load weight is requested. In particular, in the case of a vehicle on which a wheelchair user can get on, the weight cannot be appropriately managed by the number of passengers. Therefore, in the related art, a technique has been known in which the load weight of the vehicle is detected by a weight sensor, and in a case where the detection weight exceeds a prescribed first threshold value, the passenger is notified of the overweight, and the excess passengers are urged to get off the vehicle.

SUMMARY

Such a technique has no problem in a case where the weight sensor can detect the load weight with high accuracy, but usually, an error occurs in a detection value of the weight sensor due to a temperature change, a reset of electric power, or the like, and the detection value fluctuates. As a result, even when a constitution of the passengers who get on the vehicle is entirely the same, there is a case where a determination is made that the load weight is equal to or smaller than the first threshold value at certain timing and a determination is made that the load weight exceeds the first threshold value at another timing. In this case, the passenger who is once permitted to get on the vehicle is urged to get off the vehicle due to the overweight, but such a response causes confusion or dissatisfaction of the passenger.

Note that Japanese Unexamined Patent Application Publication No. 2007-218646 (JP 2007-218646 A) discloses a technique in which in a case where the presence or absence of a passenger is determined based on a result of detection of a load sensor provided on a seat of a vehicle, in order to prevent an erroneous determination due to an error of the result of detection caused by a sudden temperature change due to opening and closing of a door, a passenger determination is prohibited during a period in which the door is opened.

However, in the technique of JP 2007-218646 A, solely the number of the people who get on the vehicle is confirmed, and the load weight cannot be detected. Therefore, in the technique of JP 2007-218646 A, confusion or dissatisfaction of the passenger cannot be prevented while the load weight of the vehicle is appropriately maintained.

Therefore, the present specification discloses a load weight notification device that can prevent confusion or dissatisfaction of the passenger while the load weight of the vehicle is appropriately maintained.

An aspect disclosed in the present specification relates to a load weight notification device including a weight sensor, an output device, and a controller. The weight sensor is configured to detect a load weight of a vehicle as a detection weight. The output device is configured to notify a passenger in the vehicle of information. The controller is configured to, in a case where the detection weight obtained during an opening period of a door of the vehicle exceeds a prescribed first threshold value, instruct the output device to notify the passenger of information indicating overweight. The controller is configured to, until completion of an initial closing operation that is a closing operation of the door performed after the vehicle is activated until the vehicle starts traveling, not instruct the output device to notify the passenger of the information indicating the overweight even when the detection weight exceeds the first threshold value.

Immediately after the vehicle makes an emergency stop, an operator temporarily goes out of the vehicle and the load weight is likely to be changed, but in a case where the vehicle finally restarts traveling, a constitution of the passengers who get on the vehicle is the same as that before the emergency stop. Stated another way, the passenger who gets on the vehicle after the vehicle is reactivated is the passenger who is permitted to get on the vehicle before the emergency stop. With the configuration described above, the passenger who is permitted to get on the vehicle before the emergency stop is not notified of the overweight after the reactivation. As a result, confusion or dissatisfaction of the passenger can be prevented while the load weight of the vehicle is appropriately maintained.

In this case, the controller may be configured to, in a case where the detection weight during the opening period of the door after the completion of the initial closing operation is not changed due to getting on and off of the passenger, not instruct the output device to notify the passenger of the information indicating the overweight even when the detection weight exceeds the first threshold value.

With such a configuration, the passenger who is permitted to get on the vehicle when the door is opened previous time is not notified of the overweight. As a result, confusion or dissatisfaction of the passenger can be prevented while the load weight of the vehicle is appropriately maintained.

Also, the controller may be configured to, in a case where the detection weight during the opening period of the door after the completion of the initial closing operation is the same as an initial weight that is the detection weight immediately after the door is opened, and is equal to or smaller than an allowable weight larger than the first threshold value, not instruct the output device to notify the passenger of the information indicating the overweight even when the detection weight exceeds the first threshold value.

With such a configuration, the passenger who is permitted to get on the vehicle when the door is opened previous time can be prevented from being notified of the overweight. As a result, confusion or dissatisfaction of the passenger can be prevented while the load weight of the vehicle is appropriately maintained.

Also, the controller may be configured to, in a case where the detection weight exceeds a second threshold value smaller than the first threshold value, instruct the output device to notify the passenger of information indicating that newly getting on the vehicle is not possible.

With such a configuration, the passenger, particularly the operator, can refuse getting on of a new person other than the passenger who originally gets on the vehicle, and the load weight of the vehicle can be appropriately maintained.

Also, the controller may be configured to, in a case where the detection weight exceeds an allowable weight larger than the first threshold value, instruct the output device to notify the passenger of the information indicating the overweight even before the completion of the initial closing operation.

With such a configuration, an appropriate operation of the vehicle can be ensured.

With the load weight notification device disclosed in the present specification, confusion or dissatisfaction of the passenger can be prevented while the load weight of the vehicle is appropriately maintained.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
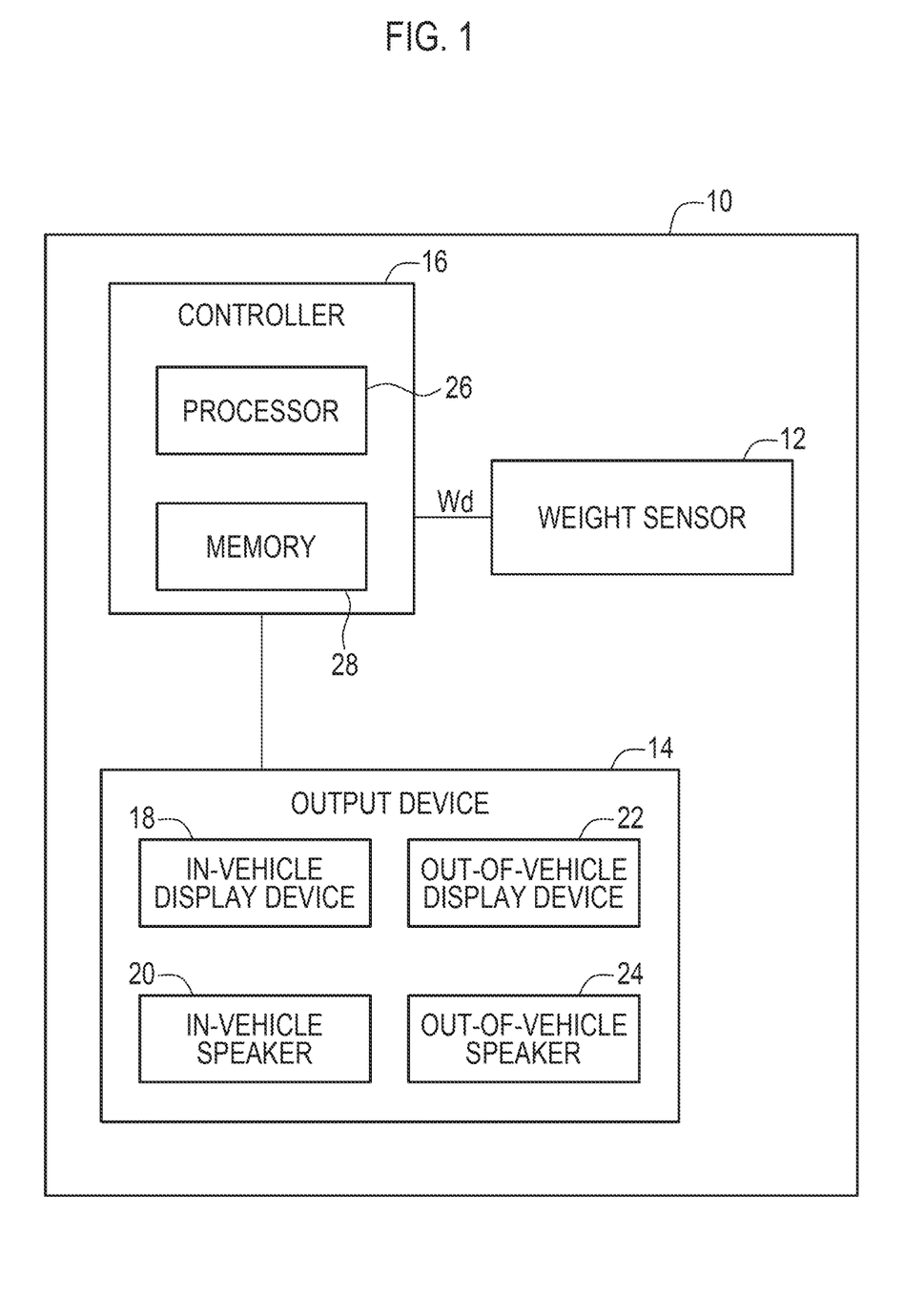
FIG. 1 is a block diagram showing a configuration of a load weight notification device.
Figure 2:
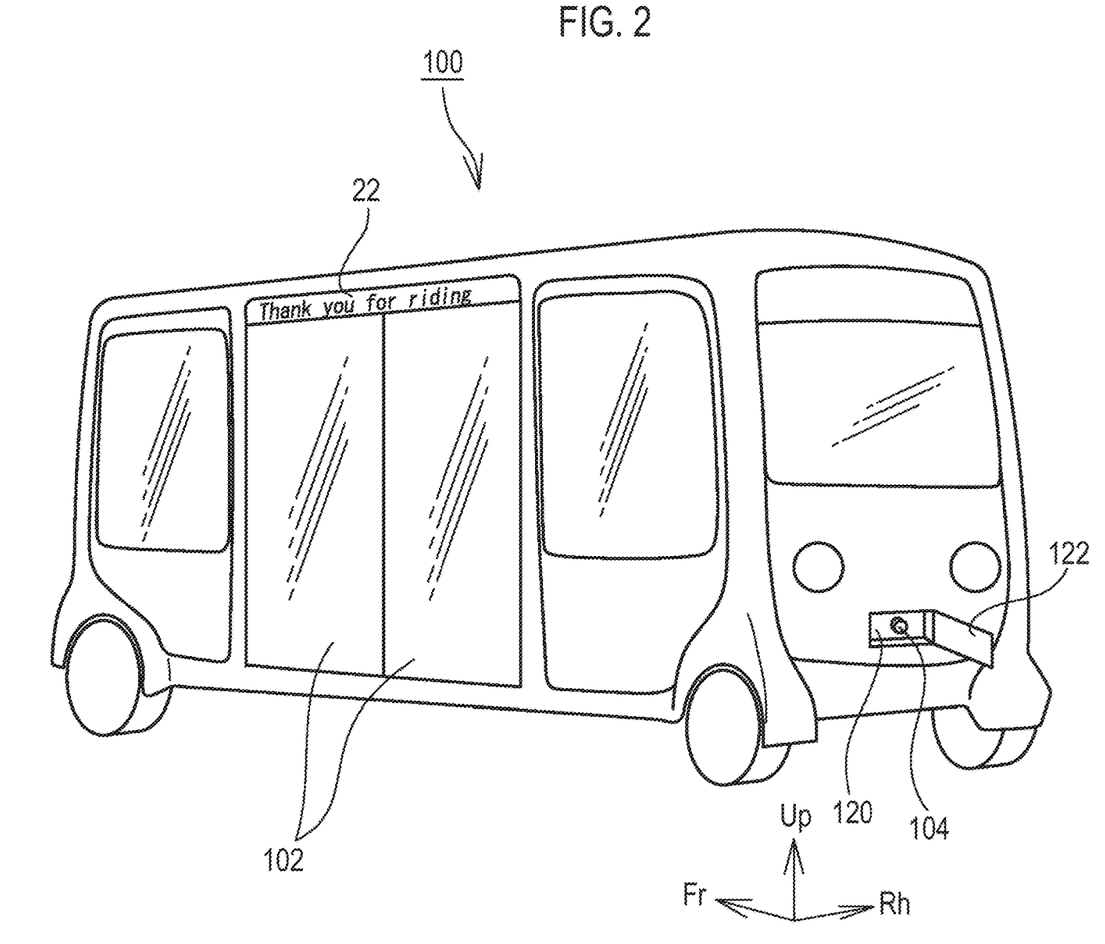
FIG. 2 is a perspective view of a vehicle equipped with the load weight notification device as viewed from behind.

Hereinafter, a configuration of a load weight notification device 10 will be described with reference to the drawings. FIG. 1 is a block diagram showing the configuration of the load weight notification device 10. In addition, FIG. 2 is a perspective view of a vehicle 100 equipped with the load weight notification device 10 as viewed from behind.

The load weight notification device 10 is a device that detects a load weight of the vehicle 100, and as needed, notifies a passenger in the vehicle 100 and/or a person outside the vehicle of information in response to the detected load weight (hereinafter, referred to as a "detection weight Wd"). Prior to the description of the load weight notification device 10, the vehicle 100 equipped with the load weight notification device 10 will be briefly described.

The vehicle 100 is a shared vehicle on which unspecified passengers get on and off, and is, for example, a bus that travels along a prescribed route and is stopped at a prescribed stopping place. The vehicle 100 of the present embodiment has an autonomous driving function in which the vehicle 100 performs all of the dynamic driving tasks. Here, "autonomous driving" means, for example, any of a level 3 to a level 5 defined by Society of Automotive Engineers (SAE) of United States. The level 3 is a driving mode in which all dynamic driving tasks are automated in a specific place, such as a highway, but a driver's operation is requested in an emergency. In addition, the level 4 is a driving mode in which all dynamic driving tasks are automated solely in a specific place, and a response in an emergency is also autonomously processed. The level 5 is a driving mode in which autonomous driving is possible under almost all conditions without restrictions, such as a place, and means so-called "fully autonomous driving". Note that in the following description, an "operator" means a person who gives various instructions to the vehicle 100, and the operator may get on the vehicle 100, or may be outside the vehicle (for example, a management center outside the vehicle) without getting on the vehicle 100.

For example, the vehicle 100 is an electric vehicle having a drive motor as a prime mover. The vehicle 100 is equipped with a main battery that supplies electric power to the drive motor. Note that the vehicle 100 is not limited to the electric vehicle, and may be another type of the vehicle. For example, the vehicle 100 may be an engine vehicle equipped with an engine (internal combustion engine) as the prime mover, or may be a hybrid vehicle equipped with the engine and the drive motor as the prime mover. In addition, the vehicle 100 may be a fuel cell vehicle in which the drive motor is driven by the electric power generated by a fuel cell.

As shown in FIG. 2, the vehicle 100 does not have a hood and a trunk, and has a substantially box-like (rectangular parallelepiped) outer shape in which a front end surface and a rear end surface rise substantially vertically. A door 102 that slides in a front-rear direction of the vehicle to be opened and closed is provided on a side surface of the vehicle 100. An opened and closed state of the door 102 is detected by a door sensor (not shown).

As one example of the autonomous driving function, the vehicle 100 has an emergency stop function. The emergency stop function is a function of autonomously stopping the vehicle 100 and stops the electric power supply to each unit of the vehicle 100 in a case where an emergency stop switch (not shown) is pressed. The emergency stop switch may be provided inside the vehicle 100, or may be provided outside the vehicle 100, for example, in the management center provided outside the vehicle. In addition, the number of emergency stop switches is not limited to one, and a plurality of the emergency stop switches may be provided. Therefore, two emergency stop switches may be provided, one emergency stop switch inside the vehicle 100 and one emergency stop switch outside the vehicle 100.

In order to start traveling again after the emergency stop, the operator needs to first turn on a power switch 104 and then turn on a start switch. The power switch 104 is a switch for restarting the electric power supply to each unit of the vehicle 100. The power switch 104 is provided on an outer surface of the vehicle 100. In an example of FIG. 2, the power switch 104 is disposed in a recess 120 formed on a rear end surface of the vehicle 100, and the power switch 104 is usually hidden by a lid 122 that covers the recess 120 and cannot be seen. In a case where the electric power is resupplied to the vehicle 100, the operator goes out of the vehicle, opens the lid 122, and presses the power switch 104. The start switch is a switch for activating a control system of the vehicle 100. The start switch is provided in the vicinity of an operator's seat in a vehicle cabin. The vehicle 100 can restart traveling by pressing the start switch.

Hereinafter, the configuration of the load weight notification device 10 will be described with reference to FIG. 1. The load weight notification device 10 is a device that detects the load weight of the vehicle 100 as the detection weight Wd, and notifies the passenger in the vehicle 100 and a person outside the vehicle of needed information in response to the detection weight Wd obtained during an opening period of the door 102. Such a load weight notification device 10 includes a weight sensor 12 that detects the load weight, an output device 14 that notifies the passenger of the information, and a controller 16 that controls the drive of the output device 14 in response to the detection weight Wd.

The weight sensor 12 detects the load weight of the vehicle 100. As such a weight sensor 12, for example, a pressure sensor that measures an oil pressure of an air suspension may be used. Further, as another mode, a load sensor that is provided between a wheel and a body and outputs an electric signal corresponding to a load may be used as the weight sensor 12. A result of the detection by the weight sensor 12 is output to the controller 16 as the detection weight Wd.

The output device 14 is a device that notifies the passenger and a person outside the vehicle of the information. The output device 14 of the present embodiment includes an in-vehicle display device 18 and an in-vehicle speaker 20 that notifies the passenger in the vehicle of the information, and an out-of-vehicle display device 22 and an out-of-vehicle speaker 24 that notifies a person outside the vehicle of the information. The in-vehicle display device 18 is a device that displays an image in a display area set in the vehicle, and may be a display in which the display area itself forms an image or may be a projector that projects an image on the display area. In addition, the in-vehicle speaker 20 outputs voice to the passenger in the vehicle.

The out-of-vehicle display device 22 is a device that displays an image on the outer surface of the vehicle 100, for example, on a display area set on an upper side of the door 102 as shown in FIG. 2, and is, for example, a display or a projector. In addition, the out-of-vehicle speaker 24 outputs voice to a person outside the vehicle.

The controller 16 instructs the output device 14 to notify the information in response to the detection weight Wd. The controller 16 is physically a computer having a processor 26 and a memory 28. The "computer" also includes a microcontroller that incorporates a computer system into an integrated circuit. Further, the processor 26 refers to a processor in a broad sense, and includes a general-purpose processor (for example, a central processing unit: CPU) or a dedicated processor (for example, a graphics processing unit: GPU, an application specific integrated: ASIC, a field programmable gate array: FPGA, and a programmable logic device). Further, the memory 28 may include at least one of a semiconductor memory (for example, a RAM, a ROM, and a solid state drive) and a magnetic disk (for example, a hard disk drive).

Further, the controller 16 may be a computer provided exclusively for the load weight notification device 10, or a control controller of the vehicle 100, a so-called electronic control unit (ECU), may be used as the controller 16 of the load weight notification device 10. The controller 16 can communicate with the control controller of the vehicle 100, and the controller 16 can grasp the opened and closed state of the door 102 and the like. Hereinafter, the operation of the load weight notification device 10 will be described. The controller 16 of the load weight notification device 10 stores a first threshold value W1 and a second threshold value W2. The first threshold value W1 is a value obtained by subtracting a margin amount from an allowable weight Wmax that can be allowable for the vehicle 100, and the margin amount is a value sufficiently larger than an error assumed by the weight sensor 12. In addition, the second threshold value W2 is a value smaller than the first threshold value W1.

In a case where the detection weight Wd detected by the weight sensor 12 exceeds the first threshold value W1, the controller 16 instructs the output device 14 to notify the information indicating the overweight. The information indicating the overweight is notified to a subject by using the display devices 18, 22 or the speakers 20, 24, or both the display devices 18, 22 and the speakers 20, 24. Therefore, as the information indicating the overweight, for example, a character string, such as "seating capacity is exceeded", may be displayed on the display devices 18, 22, or a predetermined buzzer sound may be output from the speakers 20, 24. By giving such notice of the overweight, the excess passengers who get on the vehicle are urged to get off the vehicle. Therefore, the load weight of the vehicle 100 can be maintained at an appropriate value.

Further, in a case where the detection weight Wd detected by the weight sensor 12 exceeds the second threshold value W2, the controller 16 instructs the output device 14 to notify the passenger of information indicating that newly getting on the vehicle is not possible. The second threshold value W2 is a value smaller than the first threshold value W1. Such a second threshold value W2 is, for example, a value obtained by subtracting the margin amount sufficiently larger than an error assumed by the weight sensor 12 from the first threshold value. Also, the subject is notified of the information indicating that newly getting on the vehicle is not possible by using the display devices 18, 22, the speakers 20, 24, or both the display devices and the speakers. Therefore, for example, a character string, such as "The seating capacity has been reached. Newly getting on the vehicle is not possible." may be displayed on the display devices 18, 22, or a predetermined electric sound may be output from the speakers 20, 24. By giving such notice that newly getting on the vehicle is not possible, newly getting on the vehicle is suppressed, and the occurrence of the overweight is effectively suppressed. Therefore, the load weight of the vehicle 100 can be maintained at an appropriate value.

Here, a change in the load weight occurs solely during a period in which the passenger can get on and off the vehicle, that is, during the opening period of the door 102. Therefore, the controller 16 monitors solely the detection weight Wd during the opening period of the door 102, and does not monitor the detection weight Wd during a closing period of the door 102. Note that as a matter of course, the electric power supply to the load weight notification device 10 is cut off during the period in which the vehicle 100 makes an emergency stop, the detection weight Wd cannot be monitored even when the door 102 is opened during the above period. After the emergency stop, when the power switch 104 is turned on or the start switch is turned on and the electric power supply to the load weight notification device 10 is restarted, the detection weight Wd can be monitored while the door 102 is opened. In the following, a state in which the power switch 104 is turned on or the start switch is turned on and each unit of the vehicle including the load weight notification device 10 is started to be driven is referred to as "activation of the vehicle 100".

By the way, such notice of overweight is given based on the detection weight Wd obtained by the weight sensor 12. An error occurs due to a reset of an electric circuit, a temperature change, or the like regardless of the type of the weight sensor 12. As a result, even when a constitution of the passengers who get on the vehicle is entirely the same, there is a case where the detection weight Wd equal to or smaller than the first threshold value W1 is detected at certain timing and the detection weight Wd exceeding the first threshold value W1 is detected at another timing. In a case where the passenger who considers that the vehicle is not overweight and gets on the vehicle at "certain timing" is notified of the overweight and urged to get off the vehicle at "another timing", the passenger is very confused and dissatisfied. In order to prevent such confusion or dissatisfaction of the passenger, in the present embodiment, in a period after the vehicle 100 is activated until the door 102 is initially closed and in a case where the detection weight Wd immediately after the door 102 is opened is not changed due to getting on and off of the passenger, the passenger is not notified of the overweight even when the detection weight Wd exceeds the first threshold value W1. Hereinafter, the description about the above will be made.

The vehicle 100 is activated at timing when the power switch 104 or the start switch is pressed. In a case where the door 102 is opened at a point in time of the activation, the door 102 is necessarily closed before the start of traveling. In particular, in a case where the vehicle 100 makes an emergency stop, the power switch 104 provided on the outer surface should be necessarily pressed to reactivate the vehicle. Therefore, since the operator necessarily goes out of the vehicle once to press the power switch 104, the door 102 is often opened at a point in time when the vehicle 100 is activated. In order not to start traveling in the opened state, an operation of closing the door 102 necessarily occurs before traveling is started. In the following, the closing operation of the door 102 that is performed after the vehicle 100 is activated until the start of traveling is referred to as an "initial closing operation".

Until the completion of the initial closing operation, the controller 16 does not instruct the output device 14 to notify the passenger of the information indicating the overweight even when the detection weight Wd exceeds the first threshold value W1. As a result, the passenger who is once permitted to get on the vehicle can be prevented from being notified of the overweight, and dissatisfaction or confusion of the passenger can be prevented. Note that even in such a case, in order not to confuse the passenger, the notice of the information indicating newly getting on the vehicle is not possible may be performed as long as the detection weight Wd exceeds the second threshold value W2. Further, in a case where the detection weight Wd exceeds the allowable weight Wmax before the completion of the initial closing operation, the notice of the overweight is given in order to urge the passenger to get off the vehicle.

Figure 3:
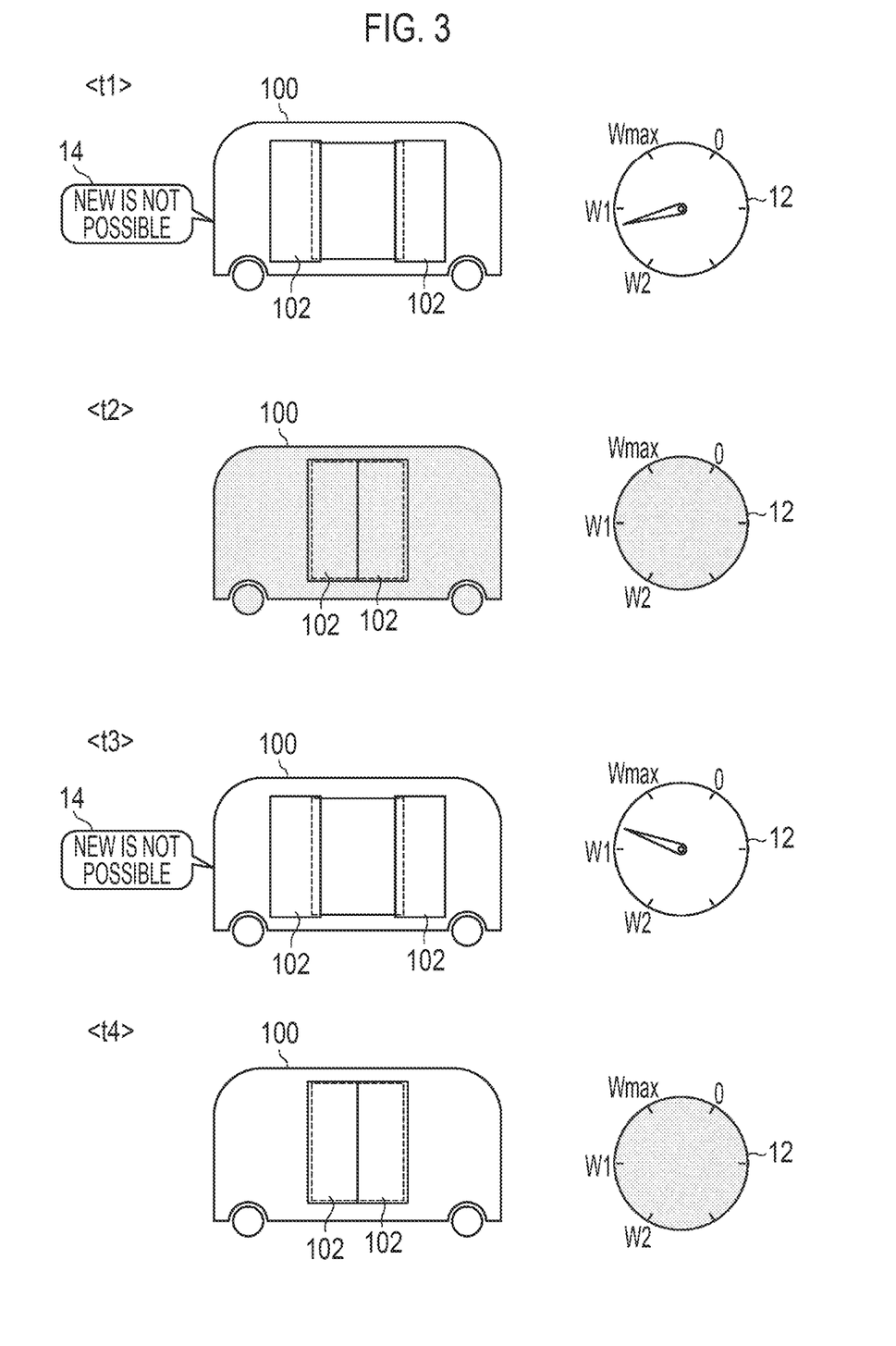
FIG. 3 is an image diagram showing an operation of the load weight notification device.

FIG. 3 is an image diagram showing the operation of the load weight notification device 10. It is assumed that the detection weight Wd obtained at certain time t1 by the weight sensor 12 is smaller than the first threshold value W1. In this case, as a matter of course, the output device 14 does not notify the passenger of the overweight.

Next, it is assumed that after time t1, the vehicle 100 makes an emergency stop for some reason at time t2 without opening and closing the door 102 once, that is, without changing the constitution of the passengers in the vehicle. In this case, the electric power supply to the load weight notification device 10 is also cut off. In this case, the operator in the vehicle manually opens the door 102, goes out of the vehicle, presses the power switch 104 provided on the outer surface, and tries to activate the vehicle 100. At this time, although the door 102 is opened, the electric power supply to the load weight notification device 10 is cut off, so that the detection weight Wd is not acquired as a matter of course.

Then, it is assumed that at time t3, the vehicle 100 is activated and the load weight notification device 10 is also reactivated. Since the door 102 is opened at time t3, the controller 16 acquires the detection weight Wd and compares the acquired detection weight Wd with the first threshold value W1. At this time, due to an error of the weight sensor 12, the detection weight Wd equal to or smaller than the first threshold value W1 may exceed the first threshold value W1 at time t1 before the reactivation. In this case, when the passenger is notified of the overweight, the passenger who gets on the vehicle 100 without any problem at time t1 before the emergency stop is urged to get off the vehicle after the reactivation. The above is not convincing for the passenger.

Therefore, as described above, in the present embodiment, after the vehicle 100 is activated, the notice of the overweight is not given until the completion of the initial closing operation. Then, when the door 102 is closed at time t4, the load weight notification device 10 temporarily stops the monitoring of the detection weight Wd.

As is clear from the above description, a configuration is adopted in which until the completion of the initial closing operation after the vehicle 100 is activated, the notice of the overweight is not given even when the detection weight Wd exceeds the first threshold value W1, so that the passenger who is once permitted to get on the vehicle can be prevented from being urged to get off the vehicle. As a result, dissatisfaction or confusion of the passenger can be prevented.

After the completion of the initial closing operation, in a case where the detection weight Wd obtained while the door 102 is opened exceeds the first threshold value W1, the notice of the overweight is given. However, even in this case, when the detection weight Wd is not changed immediately after the door 102 is opened, that is, when no person gets on and off the vehicle, the passenger is not notified of the overweight even when the detection weight Wd exceeds the first threshold value W1.

That is, the detection value of the weight sensor 12 may fluctuate due to a temperature change or the like. Therefore, even though a determination is made, when the door is opened previous time, that the detection weight Wd is equal to or smaller than the first threshold value W1, a determination may be made, when the door is opened next time, that the detection weight Wd exceeds the first threshold value W1. In this case, the notice of the overweight causes confusion or dissatisfaction of the passenger.

Therefore, in the present embodiment, each time the door 102 is opened, the detection weight Wd immediately after the opening is temporarily stored as an initial weight Wi. Then, in a case where the detection weight Wd is not changed from an initial weight Wi due to getting on and off of the passenger, the passenger in the vehicle is not notified of the overweight even when the detection weight Wd exceeds the first threshold value W1. Note that the detection weight Wd may fluctuate slightly due to a temperature change or the like that occurs after the door is opened, even when the passenger does not get on and off the vehicle. However, such a fluctuation is very small as compared with the weight of the passenger. Therefore, the controller 16 sets a reference value sufficiently larger than a fluctuation amount due to a temperature change, and determines that the passenger gets on and off the vehicle when the detection weight is changed from the initial weight Wi to equal to or larger than the reference value. Further, even in a case where the detection weight Wd is changed due to getting on and off of the passenger immediately after the door is opened, when the detection weight Wd is almost the same as the initial weight Wi and is equal to or smaller than the allowable weight Wmax, the passenger in the vehicle is not notified of the overweight even when the detection weight Wd exceeds the first threshold value W1.

Figure 4:
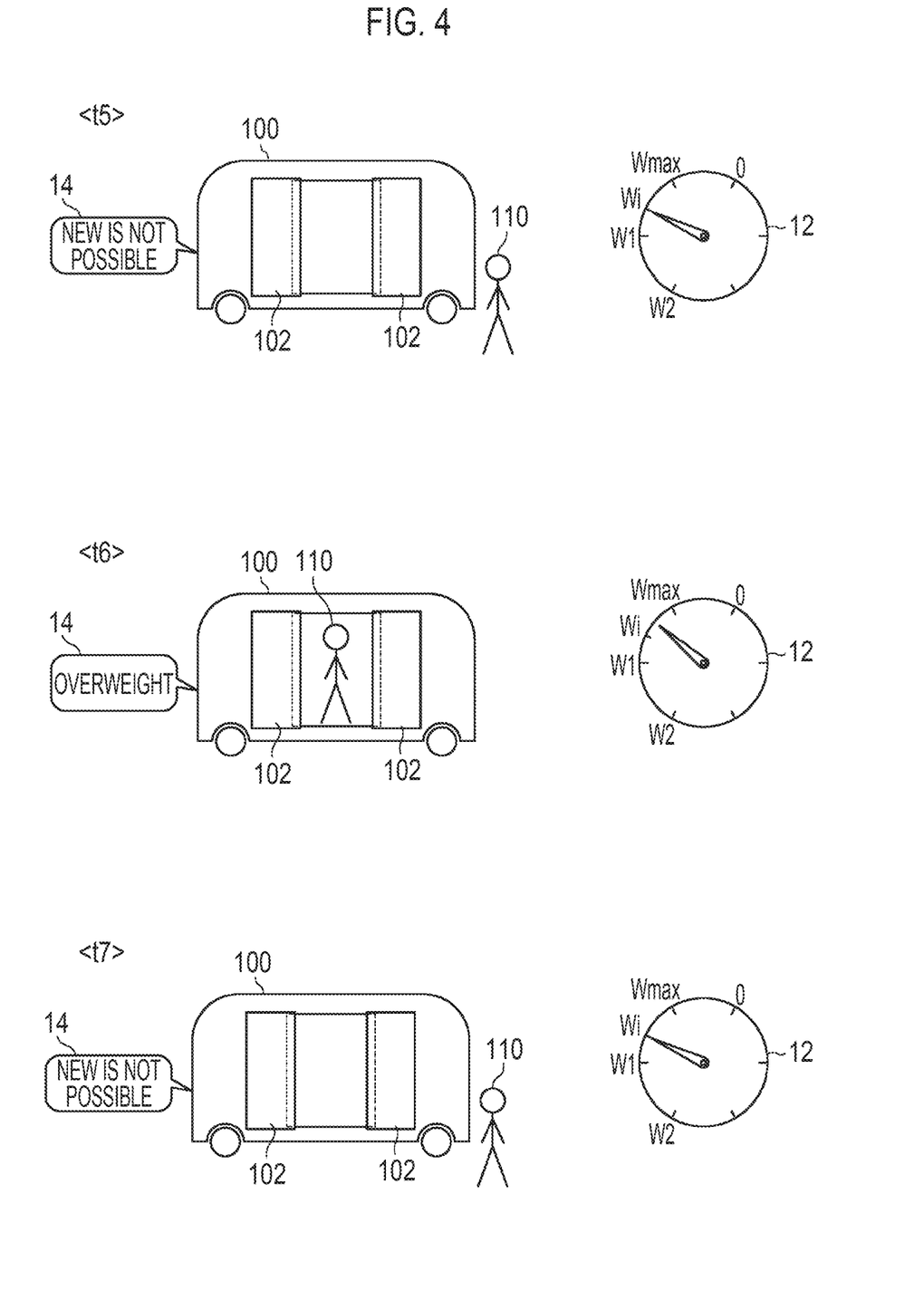
FIG. 4 is an image diagram showing another operation of the load weight notification device.

FIG. 4 is an image diagram showing the operation of the load weight notification device 10. It is assumed that the door 102 is opened at certain time t5, and the detection weight Wd immediately after the opening (that is, time t5) is larger than the first threshold value W1. The controller 16 temporarily stores the detection weight Wd immediately after the opening as the initial weight Wi.

Then, it is assumed that a user 110 outside the vehicle gets on the vehicle 100 at time t6. In this case, the detection weight Wd at time t6 is different from the initial weight Wi, and exceeds the first threshold value W1. Therefore, in this case, the controller 16 instructs the output device 14 to notify the passenger of the information indicating the overweight.

Upon receiving such notice of the overweight, the user 110 gets off the vehicle 100 at time t7. As a result, the detection weight Wd still exceeds the first threshold value W1, but returns to the same value as the initial weight Wi. In this case, the controller 16 does not notify the passenger of the overweight. As a result, the passenger who gets on the vehicle before the door 102 is opened does not need to get off the vehicle, so that confusion or dissatisfaction of the passenger can be prevented.

Note that even in this case, when the detection weight Wd exceeds the first threshold value W1, notice of the information indicating that newly getting on the vehicle is not possible, in other words, the information not for urging the passenger to get off the vehicle may be given instead of the overweight.

Figure 5:
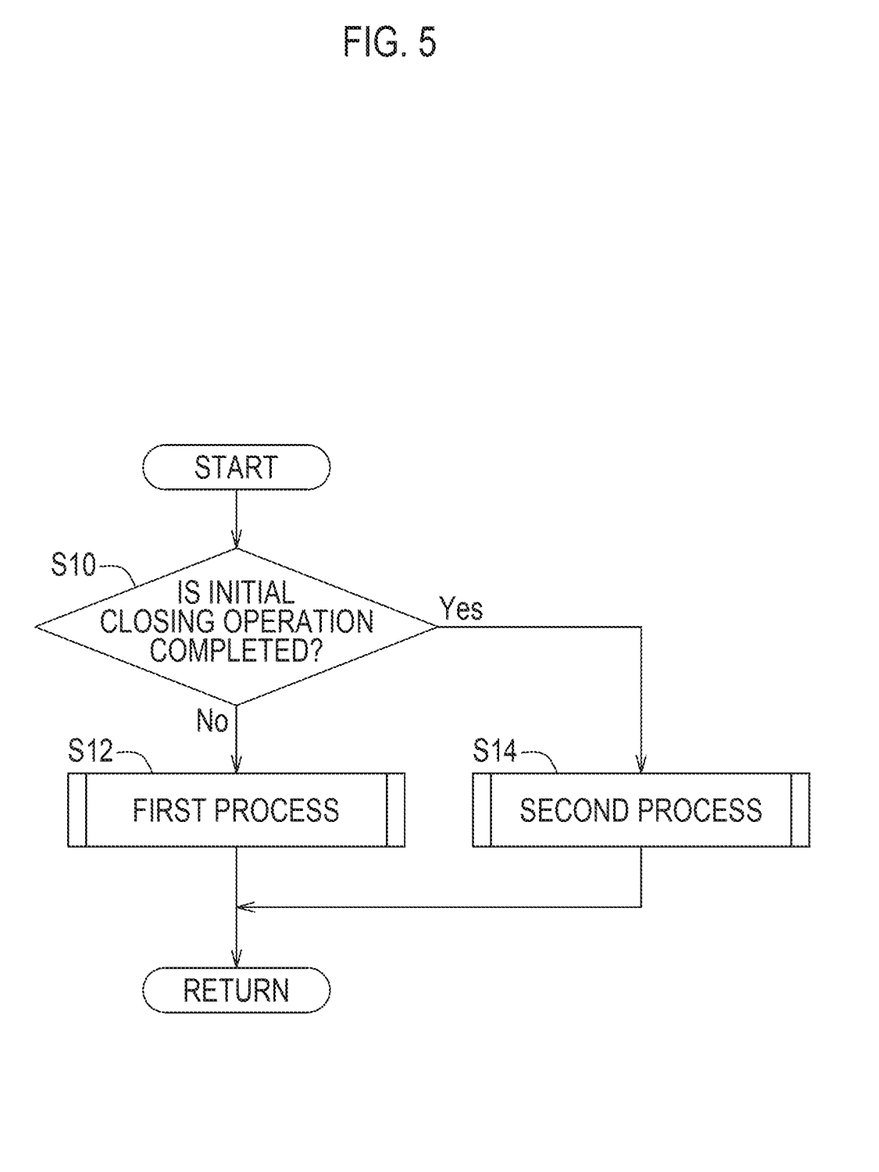
FIG. 5 is a flowchart showing a flow of a process of the load weight notification device.
Figure 6:
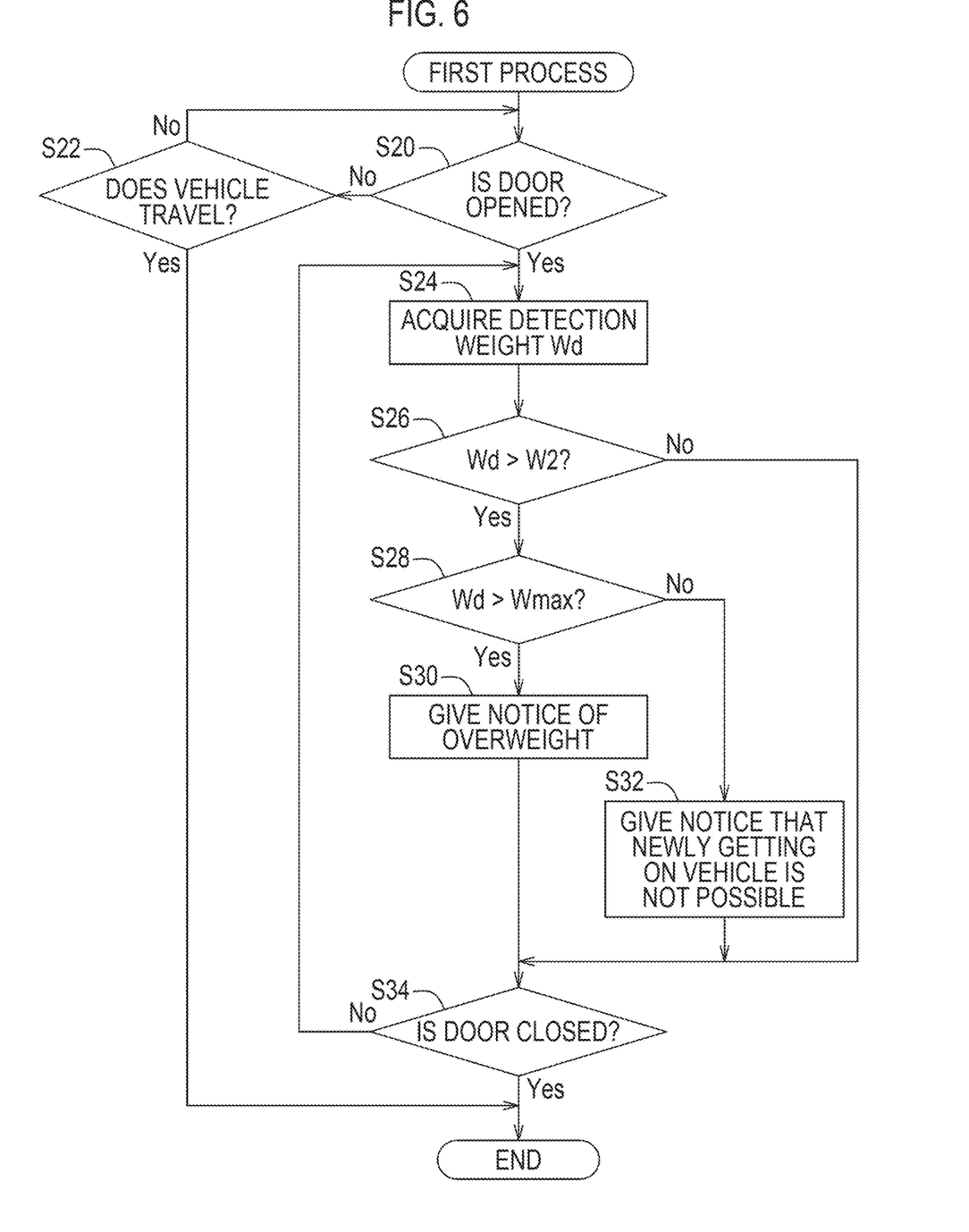
FIG. 6 is a flowchart showing a flow of a first process.
Figure 7:
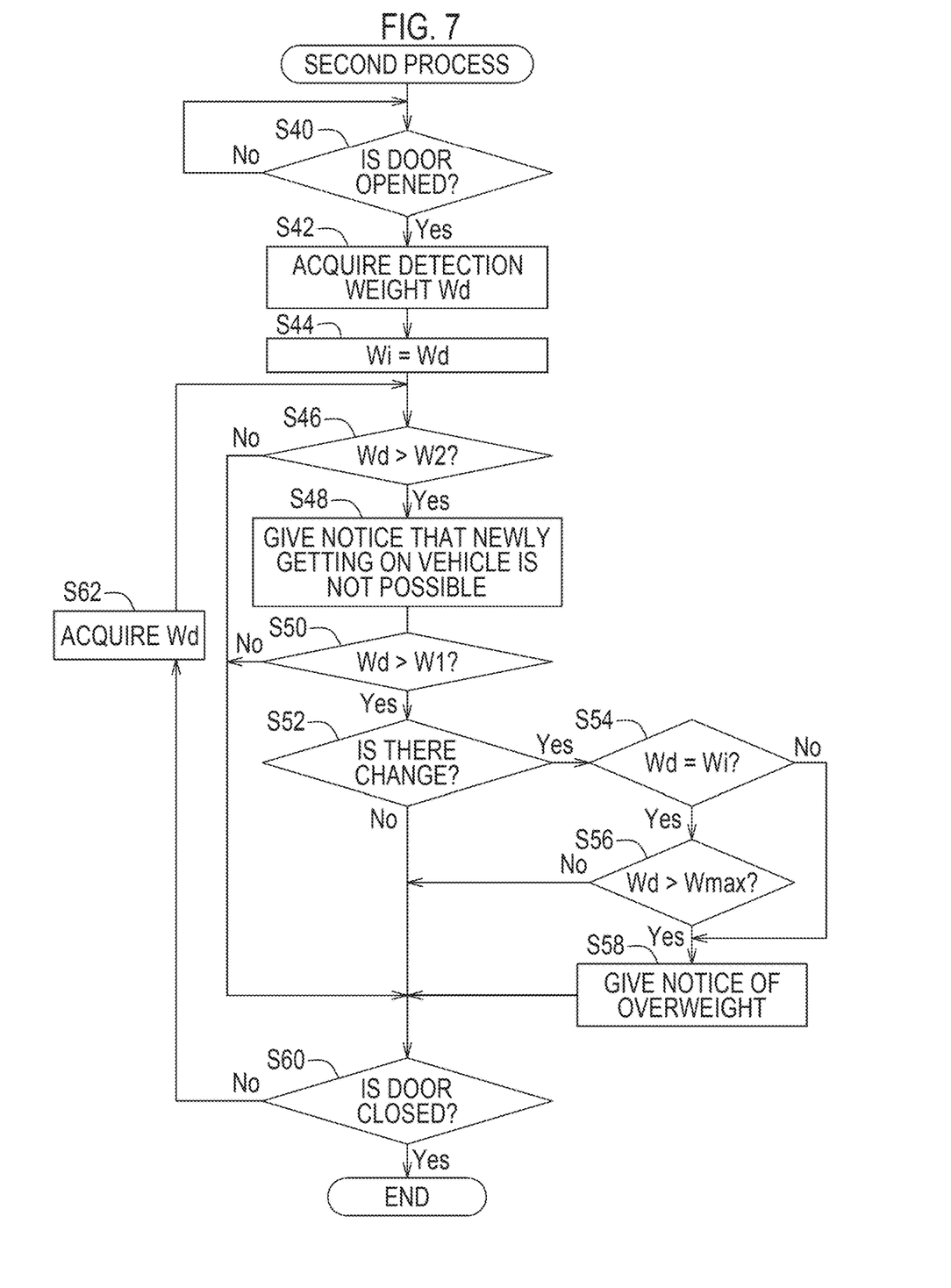
FIG. 7 is a flowchart showing a flow of a second process.

FIGS. 5 to 7 are flowcharts showing flows of processes of the load weight notification device 10. As shown in FIG. 5, the load weight notification device 10 confirms whether or not the initial closing operation is completed (step S10). The load weight notification device 10 executes a first process shown in FIG. 6 (step S12) in a case where the initial closing operation is not completed, and executes a second process shown in FIG. 7 (step S14) in a case where the initial closing operation is completed.

In the first process shown in FIG. 6, the controller 16 confirms the opened and closed state of the door 102 (step S20). In a case where the door 102 is opened (Yes in step S20), the controller 16 acquires the detection weight Wd from the weight sensor 12 (step S24). Subsequently, the controller 16 compares the detection weight Wd with the second threshold value W2 (step S26). As a result of the comparison, in a case of Wd≤W2 (No in step S26), the controller 16 does not instruct the output device 14 to notify the passenger of the information, and proceeds to step S34.

On the other hand, in a case of Wd>W2 (Yes in step S26), the controller 16 compares the detection weight Wd with the allowable weight Wmax (step S28). In a case of Wd>Wmax (Yes in step S28), it can be inferred that there is a problem in ensuring the performance of the vehicle 100, and thus the controller 16 instructs the output device 14 to output the information indicating the overweight (step S30). On the other hand, in a case of Wd≤Wmax (No in step S28), the controller 16 instructs the output device 14 to display the information indicating that newly getting on the vehicle is not possible (step S32).

In step S34, in a case where the door 102 is not closed (No in step S34), the controller 16 returns to step S24. On the other hand, in step S34, in a case where the door 102 is closed (Yes in step S34), the controller 16 determines that the initial closing operation is completed, and terminates the first process. Further, even in a case where traveling of the vehicle 100 is started without opening the door 102 even once after the vehicle 100 is activated (No in step S20, Yes in step S22), the controller 16 determines that the initial closing operation is completed, and terminates the first process.

The second process shown in FIG. 7 is executed after the initial closing operation is completed. In the second process, the controller 16 confirms the opened and closed state of the door 102 (step S40). As a result of the confirmation, in a case where the door 102 is opened (Yes in step S40), the controller 16 acquires the detection weight Wd from the weight sensor 12 (step S42). The controller 16 temporarily stores the first acquired detection weight Wd as the initial weight Wi (step S44).

Subsequently, the controller 16 compares the detection weight Wd with the second threshold value W2 (step S46). As a result of the comparison, in a case of Wd W2 (No in step S46), the controller 16 does not instruct the output device 14 to notify the passenger of the information, and proceeds to step S60.

On the other hand, in a case of Wd>Wmax (Yes in step S46), the controller 16 instructs the output device 14 to notify the passenger of the information indicating that newly getting on the vehicle is not possible (step S48). Subsequently, the controller 16 compares the detection weight Wd with the first threshold value W1 (step S50). As a result of the comparison, in a case of Wd≤W1 (No in step S50), the controller 16 proceeds to step S60.

On the other hand, in a case of Wd>W1, the controller 16 subsequently confirms whether or not the detection weight Wd is changed immediately after the door is opened (step S52). Note that the "change" here does not include a fluctuation in the detection weight Wd due to a temperature change after the door 102 is opened, and refers solely to a large change due to getting on and off of a person. In a case where the detection weight Wd is not changed (No in step S52), the controller 16 does not notify the passenger of the overweight, and proceeds to step S60 even in a case of Wd>W1.

Further, even in a case where the detection weight Wd is changed (Yes in step S52), when the detection weight Wd is the same as the initial weight Wi (Yes in step S54) and the detection weight Wd is equal to or smaller than the allowable weight Wmax (No in step S56), the controller 16 does not notify the passenger of the overweight, and proceeds to step S60. On the other hand, in a case where the detection weight Wd is different from the initial weight Wi (No in step S54) or the detection weight Wd exceeds the allowable weight Wmax (Yes in step S56), the controller 16 instructs the output device 14 to notify the passenger of the overweight (S58). Note that in step S54, "Wd=Wi?" is denoted, but as described above, when there is no large difference between the detection weight Wd and the initial weight Wi due to the getting on and off of a person, the process is executed on assumption of Wd=Wi even when there is a slight difference therebetween.

Thereafter, the controller 16 repeats steps S46 to S62 until the door 102 is closed (until Yes in S60).

As is clear from the above description, according to the present embodiment, the passenger who is once permitted to get on the vehicle is not urged to get off the vehicle as much as possible. As a result, confusion or dissatisfaction of the passenger can be effectively prevented. Note that the configuration described so far is an example, and other configuration may be changed as long as at least until the completion of the initial closing operation, the notice of the overweight is not given even when the detection weight Wd exceeds the first threshold value W1. For example, the mode of the vehicle 100 equipped with the load weight notification device 10 of the present embodiment can be freely changed, and a manually driven vehicle may be equipped with the load weight notification device 10, for example. Further, in the present embodiment, the detection weight Wd is compared with the first threshold value W1, the second threshold value W2, and the allowable weight Wmax, but the comparison with the second threshold value W2 and the allowable weight Wmax may not performed.

What is claimed is:

1. A load weight notification device comprising:
a weight sensor configured to detect a load weight of a vehicle as a detection weight;
an output device configured to notify a passenger in the vehicle of information; and
a controller configured to, in a case where the detection weight obtained during an opening period of a door of the vehicle exceeds a prescribed first threshold value, instruct the output device to notify the passenger of information indicating overweight,
wherein the controller is configured to, until completion of an initial closing operation that is a closing operation of the door performed after the vehicle is activated until the vehicle starts traveling, not instruct the output device to notify the passenger of the information indicating the overweight even when the detection weight exceeds the first threshold value.

2. The load weight notification device according to claim 1, wherein the controller is configured to, in a case where the detection weight during the opening period of the door after the completion of the initial closing operation is not changed due to getting on and off of the passenger, not instruct the output device to notify the passenger of the information indicating the overweight even when the detection weight exceeds the first threshold value.

3. The load weight notification device according to claim 2, wherein the controller is configured to, in a case where the detection weight during the opening period of the door after the completion of the initial closing operation is the same as an initial weight that is the detection weight immediately after the door is opened, and is equal to or smaller than an allowable weight larger than the first threshold value, not instruct the output device to notify the passenger of the information indicating the overweight even when the detection weight exceeds the first threshold value.

4. The load weight notification device according to claim 1, wherein the controller is configured to, in a case where the detection weight exceeds a second threshold value smaller than the first threshold value, instruct the output device to notify the passenger of information indicating that newly getting on the vehicle is not possible.

5. The load weight notification device according to claim 1, wherein the controller is configured to, in a case where the detection weight exceeds an allowable weight larger than the first threshold value, instruct the output device to notify the passenger of the information indicating the overweight even before the completion of the initial closing operation.

* * * * *